Nov. 25, 1941.                G. H. MOLDEN                2,264,028
                                GAS METER
                          Filed Aug. 28, 1939          2 Sheets-Sheet 1
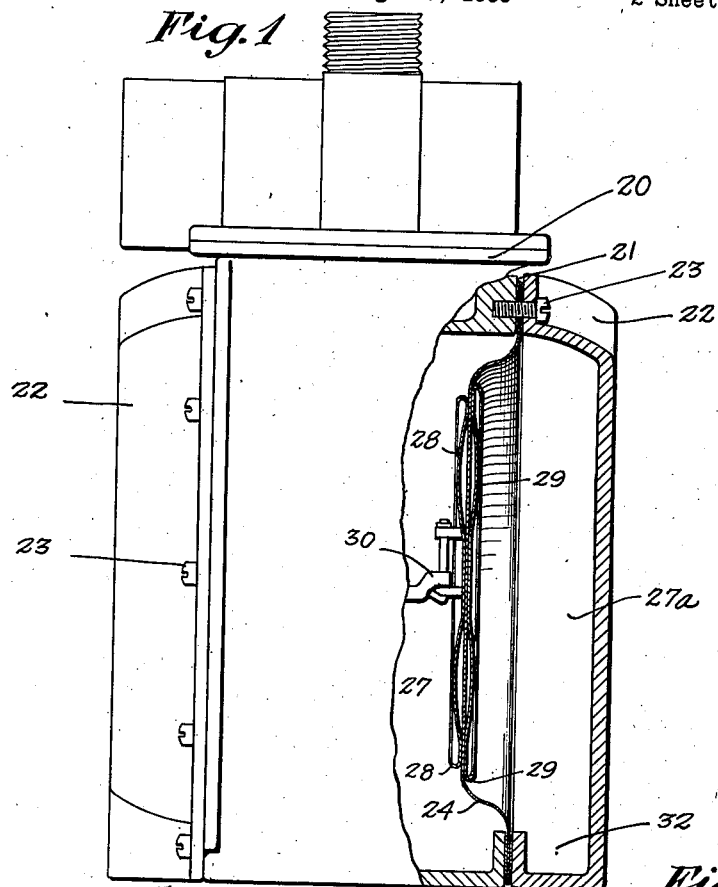
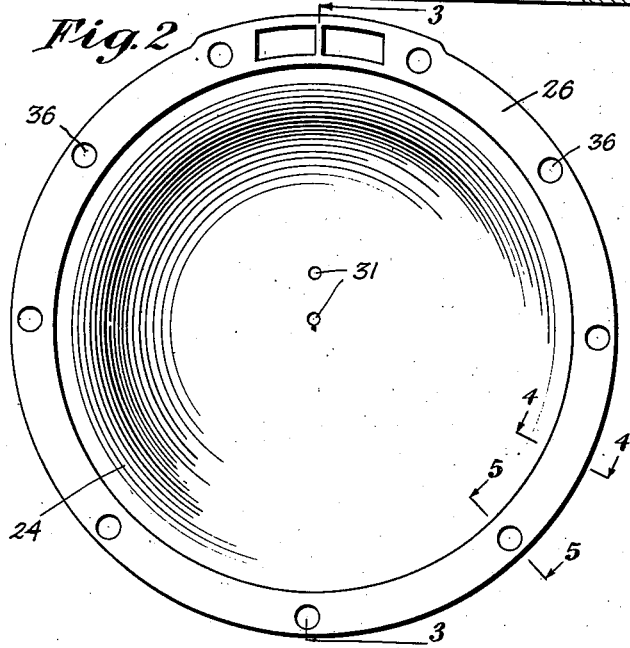
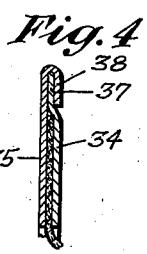
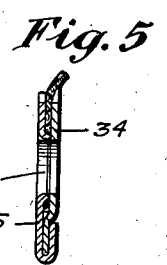
INVENTOR
George H. Molden
BY Johnson Cline & Smyth
ATTORNEYS Nov. 25, 1941.  G. H. MOLDEN  2,264,028
GAS METER
Filed Aug. 28, 1939  2 Sheets-Sheet 2
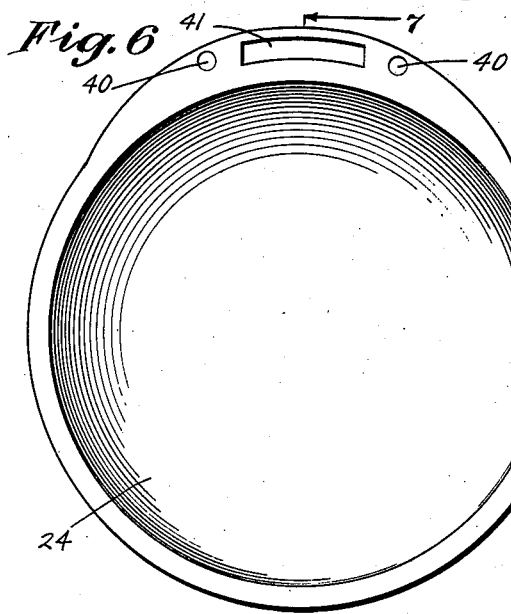
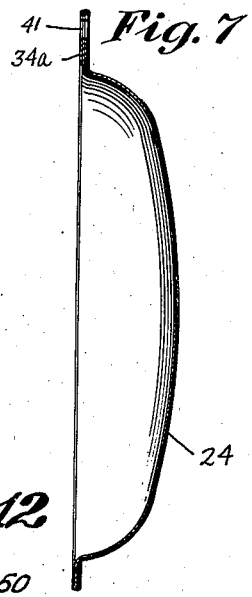
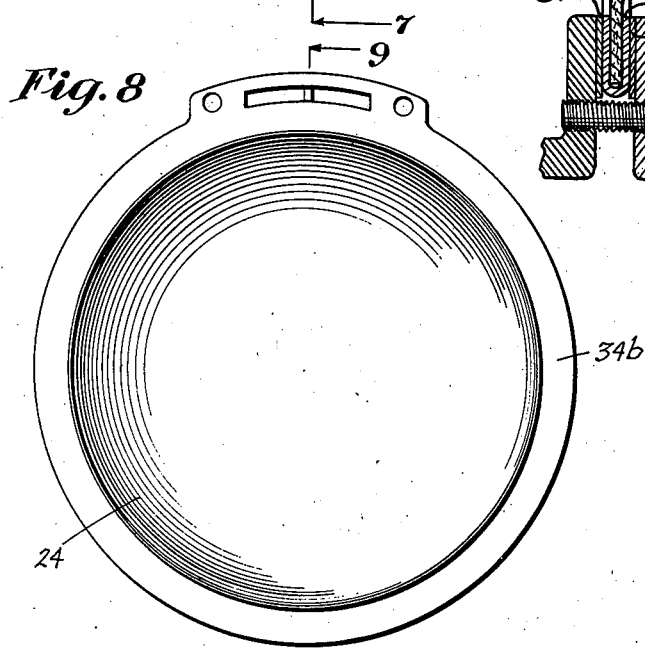
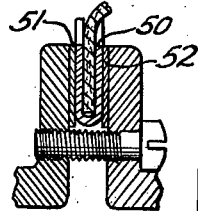
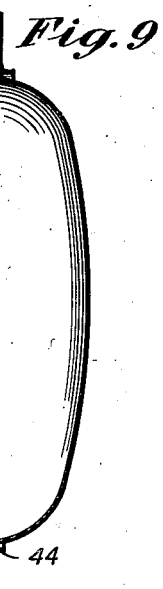
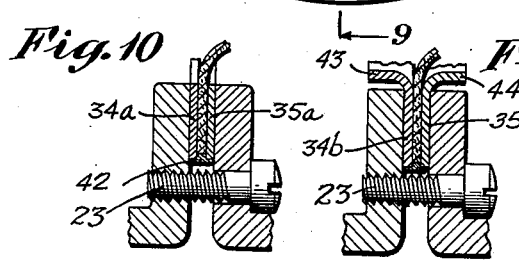
INVENTOR
George H. Molden
BY
ATTORNEYS Patented Nov. 25, 1941

2,264,028

UNITED STATES PATENT OFFICE 2,264,028

GAS METER

George H. Molden, Bridgeport, Conn., assignor to Sprague Meter Company, Bridgeport, Conn., a corporation of Connecticut Application August 28, 1939, Serial No. 292,188

13 Claims. (Cl. 73—279)

This invention relates to diaphragms, and particularly to diaphragms for use in gas meters.

In gas meters of the type to which the present invention relates, the diaphragms extend across the casing and are provided with a peripheral flange which is located between the sections of the casing and held in place therein when the sections are clamped together.

Gas is directed into chambers formed by the diaphragm to alternately move the diaphragm back and forth so as to actuate the valve and the measuring means. When wet gas is passed through the meter, certain portions of the moisture, which is a mixture of liquid hydrocarbons, collects on the diaphragm, and because of its shape drains into chambers provided therefor. When these chambers become filled, the liquid engages the diaphragm and seeps through the diaphragm to the edge thereof, whereupon it drips from the meter and produces an objectionable odor and soils and stains anything with which it comes in contact.

An object of the present invention is to provide a diaphragm which will effectively prevent seepage of the liquid. This is accomplished, according to the present invention, by providing a sealing rim around the annular flange of the diaphragm so as to enclose the edges of the latter and prevent liquid from passing therethrough.

In the preferred form of the invention, the sealing means comprises a pair of soft copper rings engaging both sides of the flange and having their outer edge secured together to enclose and seal the edge of the flange.

This sealing means also reinforces the edge of the diaphragm and during shipment holds the diaphragm in proper shape. Inasmuch as the flange is completely covered with metal, fire hazards, as would be present because of exposed leather, are entirely removed.

The flanges of the diaphragm can be provided with openings through which the bolts for securing the sections of the casing in clamping relation with the flange pass. In this form of the invention the material of the sealing member is forced through the openings to seal them, as well as the edges of the flange.

In another form of the invention, the flange is reduced so that it lies within the circle formed by the bolts when clamping the sections of the casing together. With this construction, the bolts assist in centering the flange and the diaphragm in the casing.

If desired, the sealing member can have the inner portions thereof turned outwardly to displace the edges thereof from the diaphragm and protect the same from engagement with these edges as it is flexed back and forth.

Other features and advantages of the invention will be apparent from the specification and claims when considered in connection with the drawings, in which:

Figure 1 shows a meter partly in section with the diaphragm clamped in position between sections of the casing.

Fig. 2 is a plan view of the diaphragm.

Fig. 3 is a longitudinal sectional view of the diaphragm, taken along lines 3—3 of Fig. 2.

Fig. 4 is a sectional view, taken along lines 4—4 of Fig. 2.

Fig. 5 is a sectional view, taken along lines 5—5 of Fig. 2.

Fig. 6 is a plan view of a modification of another form of the invention.

Fig. 7 is a longitudinal sectional view, taken along lines 7—7 of Fig. 6.

Fig. 8 is a plan view of a still further form of the diaphragm.

Fig. 9 is a longitudinal sectional view, taken along lines 9—9 of Fig. 8.

Fig. 10 is a detailed sectional view of the flange of the form of the invention shown in Fig. 6 between the casing sections.

Fig. 11 is a detailed sectional view of the flange of the form of the invention shown in Fig. 8 in position between the casing sections.

Fig. 12 is a detail sectional view of a flange embodying another form of the invention disposed between the casing sections.

As is shown in Fig. 1, the meter includes a body portion 20 having open ends 21. The open ends are closed by covers 22 secured to the body portion by a plurality of bolts 23 located around the edge of the cover. A diaphragm 24 extends across the open ends between each of the covers and the body portion and forms therein a plurality of measuring chambers.

Inasmuch as the diaphragm construction is similar at both ends of the meter, only one end thereof will be specifically described.

Heretofore, it has been proposed to employ a leather diaphragm and sew or tie the diaphragm material to a ring and then mount the ring between the body portion and the cover.

I have discovered, however, that when the diaphragm is so constructed the seams or joints dry out. When this condition exists, leaks will occur at the seams or joints and the register will fail to operate, especially on small quantities, as required by pilot lights or the like.

These difficulties have been overcome by the present invention by making the diaphragm of a continuous sheet of flexible material suitable for diaphragms which extends over the entire opening. In the illustrated form of the invention, it comprises a single thickness of leather, preferably sheepskin, suitably cured to prevent deterioration in use, though it is to be understood that continuous sheets of fabricated flexible material might be used.

As shown in the drawings, the diaphragm is provided with a peripheral flange 26 which extends between the body portion and the cover and is clamped therebetween when the bolts 23 are drawn up to secure the cover in place. When the diaphragm is thus positioned, it will divide the meter casing into separate measuring chambers as indicated at 27 and 27a.

The diaphragm has mounted at its center a plurality of tin plates 28, 29 secured to opposite sides of the diaphragm so as to reinforce the diaphragm and insure proper displacement thereof when the gas is passed into the chambers and in engagement therewith. As the gas fills the chambers 27 and 27a, the diaphragm will move back and forth and will actuate the valve operator for the valve which directs the gas to the measuring chambers and measuring means (not shown) through a linkage mechanism 30 secured in apertures 31 in the diaphragm.

When the meter is used with a supply of wet gas, moisture or condensate collects on the diaphragm and proper drainage of the deposited moisture from the diaphragm is obtained by shaping the diaphragms as shown in Figs. 1 and 3 so that they are substantially dish-shaped. This will cause the moisture to drain therefrom into suitable receptacles or chambers 32 provided for receiving the fluid. I have found, however, that when the chambers become filled with the condensate from the wet gas, they overflow and the condensate comes in contact with the material of the diaphragm. The condensate then seeps through the material of the diaphragm and works its way to the edge of the flange clamped between the body portion and cover to escape therefrom and drip into the room in which the meter is mounted.

This condensate is highly objectionable inasmuch as it has a very offensive odor and stains articles with which it comes in contact. Efforts have been made to control this overflow as by applying beeswax to the edges, but this has proved ineffective.

According to the present invention, flow of condensate is effectively prevented by providing a sealing means, which resists the flow of liquid, around the flange of the diaphragm disposed between the body portion and cover.

While the sealing means may be of any desired material capable of preventing flow of liquid from the edge of the flange, it is at present preferred to provide rings 34, 35 of soft metal, such as copper, on each side of the flange and join the outer ends thereof together to seal the edge of the diaphragm flange.

As shown in Figs. 1 through 5, the diaphragm flange extends across the joint between the body portion and cover substantially to the outer surface thereof and is provided with a plurality of apertures 36 through which the clamping bolts pass. In this form of the invention a ring of sealing material 34 is disposed on one face with its end offset as at 37 so as to be in the plane of the flange of the diaphragm. Another annular member 35 is positioned on the other side of the flange and has its end extending out and bent around over the offset portion at 38, as shown clearly in Fig. 4, to completely seal the edge of the flange against the passage of moisture.

It will be noted with this construction that the flange and its cover will be of substantially the same thickness throughout and form an effective gasket to insure a proper seal between the body portion and the cover.

In order to prevent seepage from working out through the apertures 36 and along the bolts 23, the sealing material of the ring is forced through the apertures in the flange, as is clearly shown in Fig. 5, into sealing relation with the material at the other side of the flange. This can be conveniently done when the apertures are formed, thus effectively enclosing the diaphragm material and sealing it against the passage of moisture into contact with the bolts.

In another form of the invention, shown in Figs. 6, 7 and 10, the diaphragm is of reduced dimensions so that it lies generally within the series of bolts securing the cover to the body portion. With this construction, it is not necessary, therefore, to align all of the openings in the flange and cover to receive the bolts passing through the cover and into the body portion. The installation of diaphragms is speeded up as the bolts around the cover will engage the edge of the flange and properly position it between the body portion and cover. The only openings which need be aligned are a pair of apertures 40, adjacent a port 41 in the flange, which receive bolts and serve to hold the diaphragm in proper position and against rotation. As is clearly shown in Fig. 10, the sealing means comprises two plates 34a, 35a of sealing material as previously noted. These are disposed at either edge of the flange and are secured together at their outer edges as at 42, by soldering, welding or by any other suitable means.

When the diaphragm is of this construction, obviously the moisture will be prevented from passing out of the free edge of the flange. Further, inasmuch as the flange is not provided with any bolt holes along the lower part thereof, danger of seepage passing along the bolts is obviously avoided.

It may be desired to provide the inner edges of the sealing means with means for protecting the diaphragm against damage during the flexing thereof. This protecting means may take many forms, but in the form of the invention shown in Figs. 8, 9 and 11, it consists in turning out the inner edges of the annular sealing members 34b, 35b, as is clearly shown in Figs. 9 and 11, to form flanges 43, 44 having their edges away from and out of contact with the diaphragm material. Thus, when the diaphragm flexes, it cannot possibly engage the edges of the sealing members, which might be sharp, and cause damage thereto. It is to be understood that this protecting feature can be applied to any of the forms of sealing means disclosed if desired and can be extended to engage the inner walls of the body portion and cover to aid in positioning the cover.

In the broader aspects of the invention, the sealing strip can be drawn or folded up from a single piece of material 50 so that it covers both of the sides and the edges of the flange to seal the same, as shown in Fig. 12.

When the diaphragm of the present invention is disposed between the cover and the body portion, additional oiled paper gaskets 51 and 52 can be inserted between the projecting flange and the body portion and cover if desired to protect the same from contact therewith.

When soft metal as copper is used as the sealing material, as in the present preferred form of the invention, the flange thus covered not only serves to prevent seepage from the edge of the diaphragm, but also becomes a very effective gasket to seal the joint between the cover and the body portion when the bolts are drawn up.

When the diaphragm is provided with the soft metal covering for the attaching flange, it not only prevents seepage of liquid therethrough, as has been fully described, but also forms a protective ring of metal which prevents any exposed leather from forming a fire hazard. The metal also forms a fairly rigid rim on the diaphragm which aids in retaining the flexible leather diaphragm in proper contour during shipment.

The diaphragm made in accordance with the present invention can be used with existing meters without requiring the change of structure of the meter, and when located in place presents an all metal exterior to the meter, the leather being enclosed by the metal flange.

Variations and modifications may be made within the scope of this invention and portions of the improvements may be used without others.

I claim:

1. In a gas meter, a casing including a body portion providing a chamber open at one end and a cover secured to the casing to close the open end and form a continuation of said chamber; and a diaphragm of flexible material capable of passing a liquid having a peripheral flange and a sealing member therefor incapable of passing said liquid enclosing and sealing said flange, said diaphragm extending across and dividing the chamber into inner and outer measuring chambers and being held in position by having the enclosed and sealed peripheral flange clamped between the body portion and the cover and exposed to the atmosphere, the sealed flange preventing the passage of liquid from within the casing through the diaphragm to the atmosphere.

2. In a gas meter, a casing including a body portion providing a chamber open at one end and a cover secured to the casing to close the open end and form a continuation of said chamber; and a diaphragm of flexible fibrous material having a peripheral flange and a sealing member therefor enclosing and sealing said flange, said diaphragm extending across and dividing the chamber into inner and outer measuring chambers and being held in position by having the enclosed and sealed peripheral flange clamped between the body portion and the cover and exposed to the exterior of the casing, the sealed flange sealing the joint between the body portion and cover against passage of fluid from within the casing and the sealing member preventing passage of liquid from the periphery of the diaphragm.

3. In a gas meter, a casing including a body portion providing a chamber open at one end and a cover secured to the casing to close the open end and form a continuation of said chamber; and a diaphragm of flexible leather having a peripheral flange and a sealing member therefor of soft metal enclosing and sealing said flange, said diaphragm extending across and dividing the chamber into inner and outer measuring chambers and being held in position by having the enclosed and sealed peripheral flange clamped between the body portion and the cover and exposed to the exterior of the casing, the soft metal of the sealed flange engaging the body portion and the cover and sealing the joint therebetween against passage of fluid from within the casing and preventing the passage of liquid from the periphery of the diaphragm.

4. In a gas meter, a casing including a body portion providing a chamber open at one end and a cover therefor forming a continuation of said chamber; means including a plurality of bolts disposed around the cover adjacent the edge thereof for securing the cover to the body portion; and a diaphragm formed from a single sheet of leather positioned across said open end and having a peripheral flange and a sealing member enclosing and sealing said flange, said flange having apertures therein and having the walls of the apertures sealed by said sealing member, said diaphragm extending across and dividing the chamber into inner and outer measuring chambers and being held in position by having the peripheral flange clamped between the body portion and the cover with the bolts passing through the apertures in the flange, the sealed flange preventing passage of liquid through the periphery of the diaphragm and through the bolt-receiving apertures.

5. In a gas meter, a casing including a body portion providing a chamber open at one end and a cover therefor forming a continuation of said chamber; means including a plurality of bolts disposed around the cover adjacent the edge thereof for securing the cover to the body portion; and a diaphragm formed from a single sheet of leather having a narrow peripheral flange and a sealing member enclosing and sealing said flange, said diaphragm extending across and dividing the chamber into inner and outer measuring chambers and being held in position by having the enclosed and sealed peripheral flange disposed within the bolts and clamped between the body portion and the cover and exposed to the atmosphere, the sealed flange sealing the joint between the body portion and cover against the passage of fluid from within the casing and the sealing member preventing passage of liquid from the periphery of the diaphragm exposed to the atmosphere.

6. In a gas meter, a casing including a body portion providing a chamber open at one end; a cover secured to the casing to close the open end and form a continuation of said chamber; and a leather diaphragm having the edge thereof covered and sealed by a pliable sealing material, said diaphragm extending across and dividing the chamber into inner and outer measuring chambers and being held in position by having the enclosed edge clamped between the body portion and the cover and exposed to the atmosphere, the sealed edge preventing passage of liquid from the exposed edge of the diaphragm to the atmosphere.

7. In a gas meter, a casing including a body portion providing a chamber open at one end; a cover secured to the casing to close the open end and form a continuation of said chamber, said body portion and cover having opposed flat end surfaces for the full extent thereof; and a diaphragm of material capable of passing a liquid having a peripheral flange and a cover of a pliable material incapable of passing a liquid enclosing and sealing said flange, said diaphragm extending across and dividing the chamber into inner and outer measuring chambers and being held in position by having the sealed peripheral flange clamped between the flat surfaces of the body portion and cover and exposed to the atmosphere, the sealed flange preventing passage of liquid from within the casing to the atmosphere.

8. In a gas meter, a casing including a body portion providing a chamber open at one end; a cover secured to the casing to close the open end and form a continuation of said chamber, said body portion and cover having opposed flat end surfaces for the full extent thereof; and a diaphragm of leather capable of passing a liquid having a peripheral flange and a cover of a soft metal incapable of passing a liquid enclosing and sealing said flange, said diaphragm extending across and dividing the chamber into inner and outer measuring chambers and being held in position by having the sealed peripheral flange clamped between the flat surfaces of the body portion and cover and exposed to the atmosphere, the soft metal exterior of the sealed flange engaging the flat surfaces and sealing the joint between the body portion and the cover against passage of fluid from within the casing and preventing the passage of liquid from the edge of the diaphragm.

9. A diaphragm for gas meters of the type having a divided casing between which the diaphragm is to be clamped comprising a flexible disk of material impervious to gas but capable of passing a liquid having a peripheral flange to be clamped between sections of the meter casing, said flange only being enclosed and completely sealed by a sealing member comprising a layer of sealing material incapable of passing said liquid whereby seepage of liquid from the diaphragm through the periphery thereof is prevented.

10. A diaphragm for gas meters of the type having a divided casing between which the diaphragm is to be clamped comprising a flexible dish-shaped leather disk having a flat peripheral flange to be clamped between sections of the meter casing; and a soft metal sealing member engaging the sides and edge of said flange to enclose and seal the periphery of the diaphragm against the passage of liquid therethrough.

11. A diaphragm for a gas meter of the type having a divided casing between which the diaphragm is to be clamped comprising a flexible leather disk having a peripheral flange to be clamped between sections of the meter casing; and a soft metal sealing member comprising a pair of rings engaging the sides of the flange and having the outer edges thereof secured together to enclose and seal the periphery of the diaphragm against the passage of liquid therethrough.

12. A diaphragm for gas meters of the type having a divided casing between which the diaphragm is to be clamped by bolts comprising a flexible leather disk having a peripheral flange provided with a plurality of apertures for receiving the clamping bolts of the casing; and a soft metal sealing member engaging the sides and edge of the flange and being pressed together through the apertures to enclose and seal the periphery of the diaphragm against the passage of liquid therefrom.

13. A diaphragm for gas meters of the type having a divided casing between which the diaphragm is to be clamped comprising a flexible leather disk having a peripheral flange to be clamped between sections of the meter casing; a soft pliable sealing member for the flange comprising a ring of sealing material engaging one side of the flange and having its outer edge offset and disposed in the plane of the flange; and another ring of sealing material engaging the other side of the flange and having its outer edge extending outwardly and then back and over the offset portion of the first ring to seal the edge of the flange against the passage of liquid therethrough.

GEORGE H. MOLDEN.